(12) United States Patent
Tsukihara

(10) Patent No.: US 8,106,963 B2
(45) Date of Patent: Jan. 31, 2012

(54) FLICKER CORRECTING DEVICE AND FLICKER CORRECTING METHOD

(75) Inventor: Koji Tsukihara, Tokyo (JP)

(73) Assignee: Panasonic Corporation, Osaka (JP)

( * ) Notice: Subject to any disclaimer, the term of this patent is extended or adjusted under 35 U.S.C. 154(b) by 363 days.

(21) Appl. No.: 12/279,515

(22) PCT Filed: Feb. 16, 2006

(86) PCT No.: PCT/JP2006/302756
§ 371 (c)(1),
(2), (4) Date: Aug. 14, 2008

(87) PCT Pub. No.: WO2007/094066
PCT Pub. Date: Aug. 23, 2007

(65) Prior Publication Data
US 2009/0033763 A1    Feb. 5, 2009

(51) Int. Cl.
*H04N 9/73* (2006.01)
(52) U.S. Cl. .................................................. 348/226.1
(58) Field of Classification Search ............... 348/226.1, 348/227.1, 228.1
See application file for complete search history.

(56) References Cited

U.S. PATENT DOCUMENTS

| | | | |
|---|---|---|---|
| 7,034,870 B2* | 4/2006 | Nagaoka et al. | 348/228.1 |
| 7,126,639 B2* | 10/2006 | Cazier et al. | 348/370 |
| 7,164,439 B2* | 1/2007 | Yoshida et al. | 348/226.1 |
| 2002/0044205 A1* | 4/2002 | Nagaoka et al. | 348/229 |
| 2003/0142239 A1* | 7/2003 | Yoshida et al. | 348/607 |

FOREIGN PATENT DOCUMENTS

| | | |
|---|---|---|
| JP | 11-205658 A | 7/1999 |
| JP | 2002-374456 | 12/2002 |
| JP | 2003-37774 | 2/2003 |
| JP | 2003-60984 | 2/2003 |
| JP | 3422638 | 4/2003 |
| JP | 2003-134391 | 5/2003 |
| JP | 2003-179805 | 6/2003 |
| JP | 2003-189173 A | 7/2003 |
| JP | 2003-259178 | 9/2003 |

OTHER PUBLICATIONS

International Search Report for PCT/JP2006/302756; Nov. 1, 2006.

* cited by examiner

*Primary Examiner* — Nicholas Giles
(74) *Attorney, Agent, or Firm* — Pearne & Gordon LLP

(57) ABSTRACT

Provided are a flicker correcting device and a flicker correcting method which are capable of reducing the frequency of occurrence of a flicker during detection of the flicker. A nonvolatile memory stores information on a power source frequency of illumination under an image pickup environment. A control unit performs a setting related to flicker correction of an image pickup unit based on the information stored in the nonvolatile memory. A signal processing circuit detects a flicker from image data acquired in the set state. The control unit writes the information on the power source frequency of illumination under the image pickup environment into the nonvolatile memory based on a result of flicker detection by the signal processing circuit.

8 Claims, 4 Drawing Sheets

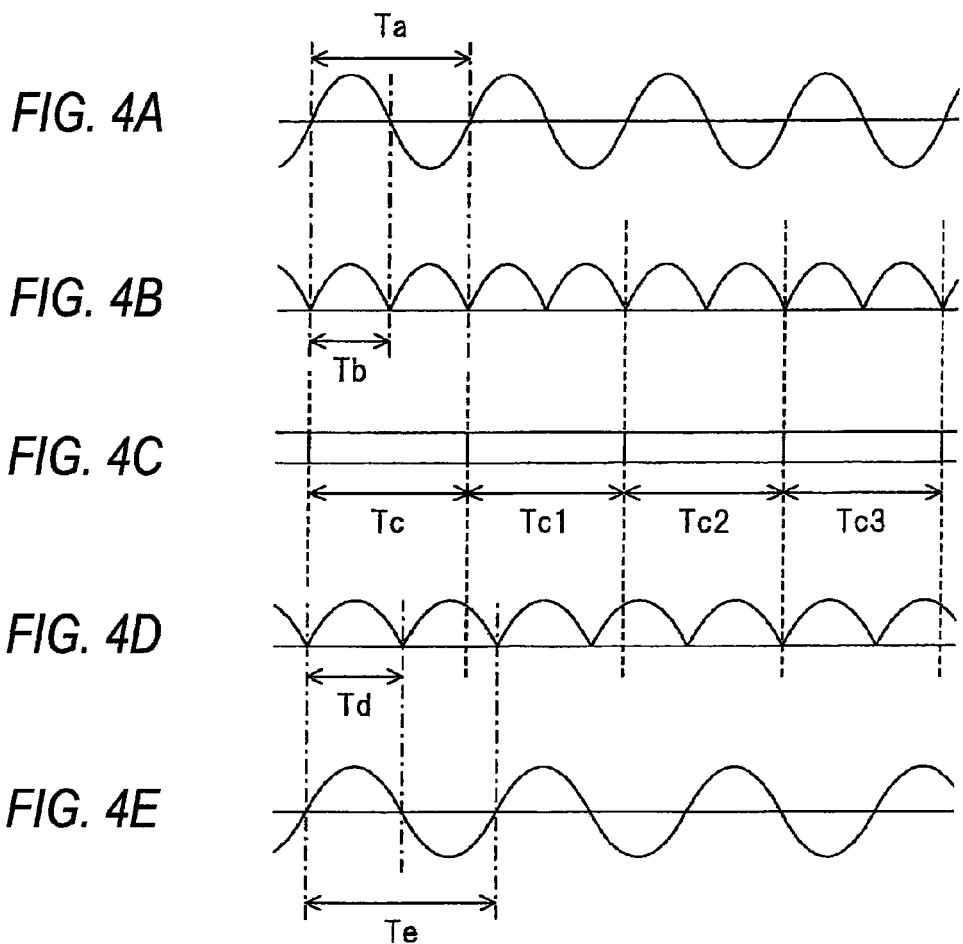
*FIG. 4A*
*FIG. 4B*
*FIG. 4C*
*FIG. 4D*
*FIG. 4E*
*FIG. 5*
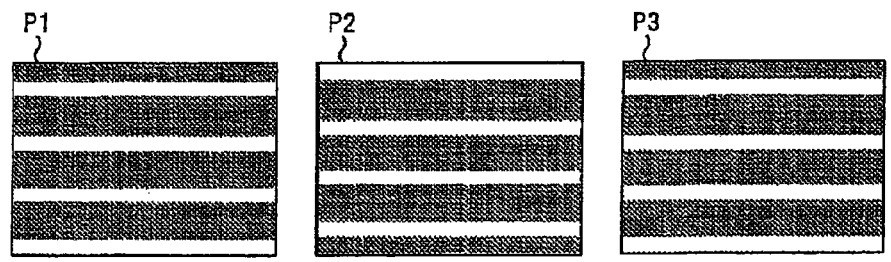

FLICKER CORRECTING DEVICE AND FLICKER CORRECTING METHOD

TECHNICAL FIELD

The present invention relates to a flicker correcting device and a flicker correcting method.

BACKGROUND ART

An image pickup device, such as a digital camera and the like, picks up an image of an object under different environments, for example, under illumination by a fluorescent lamp indoors. As a fluorescent lamp is directly driven by a commercial AC power source, its luminance is varied with a frequency which is double a frequency of the commercial AC power source. Such variation of the luminance of the fluorescent lamp produces a so-called "flicker effect" that flickers appear in an image signal obtained by an image pickup device.

Commercial AC power sources used in different countries or areas have different frequencies. For example, a frequency of a commercial AC power source in Japan is 50 Hz in East Japan and 60 Hz in West Japan. Therefore, if an image pickup device is used in different countries or areas where commercial AC power sources (hereinafter abbreviated as "AC power source") having different frequencies are used, it is required to correct a flicker depending on power source frequencies of the different countries or areas.

FIGS. 4A to 4E are views for explaining comparison of luminance variation of a fluorescent lamp with a timing of exposure time; FIG. 4A showing a voltage waveform of an AC power source (60 Hz), FIG. 4B showing luminance variation of the fluorescent lamp driven by the AC power source (60 Hz), FIG. 4C showing exposure time of an image pickup device at a shutter speed of $\frac{1}{60}$ seconds, FIG. 4D showing luminance variation of the fluorescent lamp driven by a AC power source (50 Hz), and FIG. 4E showing a voltage waveform of the AC power source (50 Hz). FIG. 5 is a view showing an example of display of a flicker.

As shown in FIG. 4A, when an AC power source frequency is 60 Hz, its period (Ta) is $\frac{1}{60}$ seconds. As shown in FIG. 4B, when a fluorescent lamp is driven by the AC power source shown in FIG. 4A, its brightness is varied at a period (Tb=Ta/2=$\frac{1}{120}$ seconds).

As shown in FIGS. 4B and 4C, if exposure time (Tc) is set to $\frac{1}{60}$ seconds, 2 periods (2×Tb=$\frac{1}{60}$ seconds) of luminance variation of the fluorescent lamp match up to the exposure time (Tc). Accordingly, when an image is picked up at the AC power source frequency of 60 Hz under illumination of the fluorescent lamp, there is no variation of amount of exposure at periods Tc1, Tc2 and Tc3. Accordingly, there occurs no flicker.

On the other hand, as shown in FIG. 4E, when an AC power source frequency is 50 Hz, its period (Te) is $\frac{1}{50}$ seconds. As shown in FIG. 4D, when a fluorescent lamp is driven by the AC power source shown in FIG. 4E, its brightness is varied at a period (Td=Te/2=$\frac{1}{100}$ seconds).

As shown in FIGS. 4D and 4C, if exposure time is set to $\frac{1}{60}$ seconds, there is a deviation between a period of luminance variation of the fluorescent lamp and the exposure time (Tc). Accordingly, when an image is picked up at the AC power source frequency of 50 Hz under illumination of the fluorescent lamp, the amount of exposure is different in periods Tc1, Tc2 and Tc3.

In this manner, different amounts of exposure for the periods Tc1, Tc2 and cause variation in the picked image, for example, as shown in FIG. 5. Pictures P1, P2 and P3 shown in FIG. 5 are pictures picked in continuous exposure periods and have their respective stripes having different vertical positions.

In the example shown in FIGS. 4A to 4E, although there occurs no flicker when the image pickup device is used in an area where the AC power source is 60 Hz, there occurs a flicker when the image pickup device is used in an area where the AC power source is 50 Hz.

For the purpose of removing a flicker in either case where the AC power source frequency of the fluorescent lamp is 50 Hz or 60 Hz as described above, for example, Patent Document 1 discloses a television camera device including electronic shutter means that automatically varies exposure time depending on brightness of an object, fixing means that fixes a shutter speed of the electronic shutter means to a particular speed without depending on the brightness of the object in order to suppress a picture from being flickered, and means that optionally switches between automatically varying the shutter speed of the electronic shutter means and fixing the shutter speed to the particular speed.

[Patent Document 1] Japanese Patent No. 3422638

DISCLOSURE OF THE INVENTION

Problems to be Solved by the Invention

In the above-mentioned device which is capable of removing the flicker, the flicker is very likely to occur during detection of flicker until the flicker is completed to be corrected after a process of detecting the flicker starts. For example, when the image pickup device starts to perform a process of detecting a flicker and a process of correcting the flicker, if exposure time at the start is set to $\frac{1}{60}$ seconds, there may occur a flicker every start under illumination of a fluorescent lamp in an area where an AC power source frequency is 50 Hz.

In consideration of the above circumstances, it is an object of the invention to provide a flicker correcting device and a flicker correcting method which are capable of reducing the frequency of occurrence of a flicker during detection of the flicker.

Means for Solving the Problems

In order to achieve the above-mentioned object, according to a first aspect of the invention, there is provided a flicker correcting device including: a nonvolatile memory that stores information on a power source frequency of illumination under an image pickup environment; a flicker correction setting unit that performs a setting related to flicker correction of an image pickup unit that picks up an image, based on the information stored in the nonvolatile memory; a flicker detecting unit that detects a flicker from image data acquired in a state set by the flicker correction setting unit; and a writing unit that writes the information on the power source frequency of illumination under the image pickup environment into the nonvolatile memory based on a result of detection by the flicker detecting unit.

With this configuration, the information on the power source frequency of illumination under the image pickup environment, which is obtained based on the result of the flicker detection, is stored in the nonvolatile memory. In addition, since the flicker correction setting is performed using information on a previous power source frequency, which is read from the nonvolatile memory, before the flicker is detected, there occurs no flicker when the power source frequency is used under the environment of same power source frequency. Accordingly, it is possible to reduce the frequency of occurrence of flickers during flicker detection.

According to a second aspect of the invention, preferably, in the aforementioned flicker detecting device as set forth in the first aspect, the writing unit writes the information on the power source frequency into the nonvolatile memory only when a flicker is detected by the flicker detecting unit.

With this configuration, since the information on the power source frequency is written into the nonvolatile memory only when a flicker is detected, when it is regarded that there is no change in the power source frequency of illumination under image pickup environments, writing of the information into the nonvolatile memory can be omitted.

According to a third aspect of the invention, there is provided a flicker correcting method including the steps of: reading information on a power source frequency of illumination under an image pickup environment from a nonvolatile memory that stores the information; performing a flicker correction setting by controlling exposure time, based on the information read from the nonvolatile memory; detecting a flicker from image data acquired in the set state; and writing the information on the power source frequency of illumination under the image pickup environment into the nonvolatile memory based on a result of the flicker detection.

With this method, the information on the power source frequency of illumination under the image pickup environment, which is obtained based on the result of the flicker detection, is stored in the nonvolatile memory. In addition, since the flicker correction setting is performed using information on a previous power source frequency, which is read from the nonvolatile memory, before the flicker is detected, there occurs no flicker when the power source frequency is used under the environment of same power source frequency. Accordingly, it is possible to reduce the frequency of occurrence of flickers during flicker detection.

According to a fourth aspect of the invention, there is provided a flicker correcting program to cause a computer to perform the steps set forth in the above third aspect.

With this program, the information on the power source frequency of illumination under the image pickup environment, which is obtained based on the result of the flicker detection, is stored in the nonvolatile memory. In addition, since the flicker correction setting is performed using information on a previous power source frequency, which is read from the nonvolatile memory, before the flicker is detected, there occurs no flicker when the power source frequency is used under the environment of same power source frequency. Accordingly, it is possible to reduce the frequency of occurrence of flickers during flicker detection.

EFFECTS OF THE INVENTION

The present invention can provide a flicker correcting device and a flicker correcting method which are capable of reducing the frequency of occurrence of a flicker during detection of the flicker.

BRIEF DESCRIPTION OF THE DRAWINGS

FIGS. 4A to 4E are views for explaining comparison of luminance variation of a fluorescent lamp with a timing of exposure time; and FIG. 5 is a view showing an example of display of a flicker.

DESCRIPTION OF REFERENCE NUMERALS AND SIGNS

1: IMAGE PICKUP DEVICE
2: IMAGE PICKUP UNIT
3: DISPLAY UNIT
4: DISPLAY PROCESSING CIRCUIT
5: NONVOLATILE MEMORY
6: CONTROL UNIT
10: FLICKER CORRECTING DEVICE
21: LIGHT RECEIVING UNIT
22: A/D CONVERTER
23: SIGNAL PROCESSING CIRCUIT
24: MEMORY
25: INTERFACE

BEST MODE FOR CARRYING OUT THE INVENTION

Figure 1:
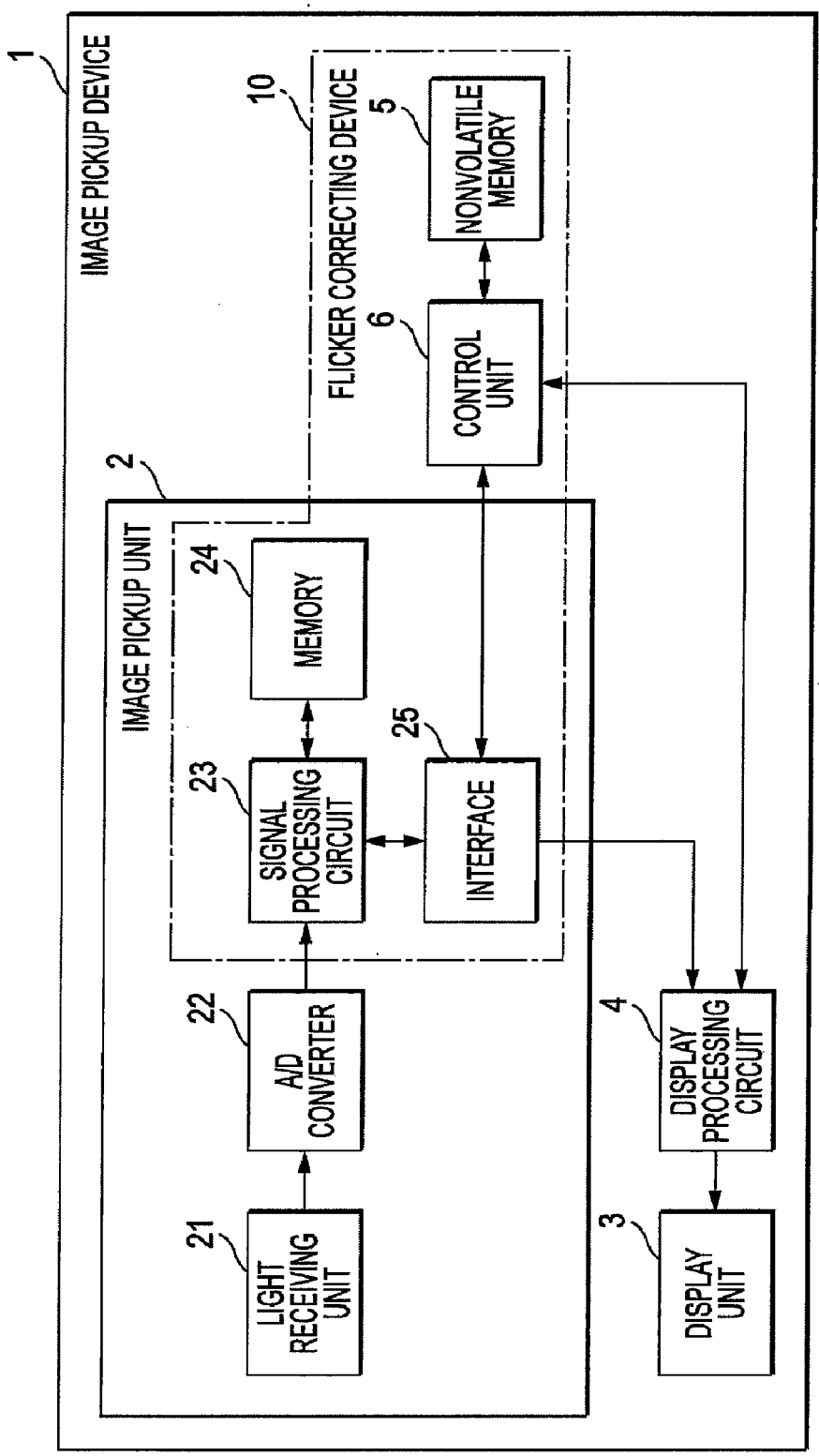
FIG. 1 is a block diagram showing a main configuration of an image pickup device according to an embodiment of the present invention.

FIG. 1 is a block diagram showing a main configuration of an image pickup device 1 according to an embodiment of the present invention. As shown in FIG. 1, an image pickup device 1 includes an image pickup unit 2, a display unit 3, a display processing 4, a nonvolatile memory 5 and a control unit 6.

The image pickup unit 2 includes a light receiving unit 21 including an image pickup optical system, and a CMOS (Complementary Metal Oxide Semiconductor) imaging device or a CCD (Charge Coupled Device) imaging device, etc, an A/D converter 22 that converts an analog signal from the light receiving unit 21 into a digital signal, a signal processing circuit 23 such as a DSP (Digital Signal Processor), a memory 24 that stores information written from the signal processing circuit 23, and an interface 25 connected to the display processing circuit 4, the control unit 6 and the signal processing circuit 23.

The display unit 3 is, for example, a liquid crystal display (LCD) and displays an image picked by the image pickup unit 2. The display processing circuit 4 performs signal processing for image data outputted from the image pickup unit 2 through the interface 25 to generate a display signal to be outputted to the display unit 3.

The nonvolatile memory 5 stores information about power source frequencies of illumination under imaging environments, and the like, which are outputted from the control unit 6. The control unit 6 controls the image pickup device 1 as a whole and is mainly configured by a processor operated by a predetermined program.

In FIG. 1, the flicker correcting device 10 includes the signal processing circuit 23, the memory 24, the interface 25, the nonvolatile memory 5 and the control unit 6 and is applicable to an image pickup device such as a digital camera, a mobile terminal having an imaging function, etc. A processor included in the control unit 6 is operable by a flicker correcting program.

Figure 2:
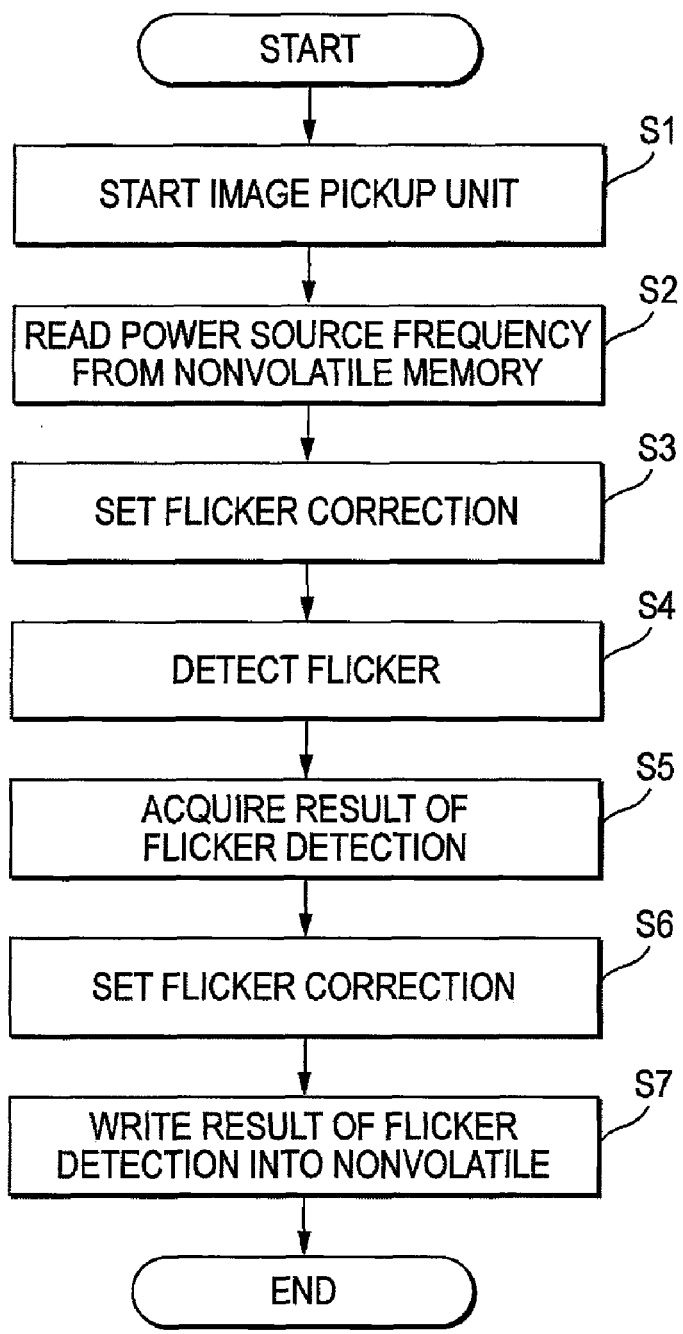
FIG. 2 is a flow chart illustrating a first example of a flicker correcting method according to an embodiment of the invention.

FIG. 2 is a flow chart illustrating a first example of a flicker correcting method according to an embodiment of the invention. As shown in FIG. 2, when the image pickup unit 2 starts (Step S1), the control unit 6 reads a power source frequency, which is stored in the nonvolatile memory 5, into the memory 24 through the interface 25 and the signal processing circuit 23 (Step S2). In addition, the control unit 6 writes a flicker detection command into the signal processing circuit 23 through the interface 25. In Step S1, the image pickup unit 2 starts based on, for example, an input from an operating unit (not shown) and the control by the control unit 6. In the nonvolatile memory 5 is stored a power source frequency of illumination under imaging environments when the image pickup device 1 was used last time.

The signal processing circuit 23 performs a flicker correction setting based on the power source frequency written in the memory 24 (Step S3), processes an image signal, which is inputted from the light receiving unit 21 through the A/D converter 22, based on the flicker correction setting, and stores the processed image signal, as image data, in the memory 24. For example, if the power source frequency stored in the nonvolatile memory is 60 Hz, the signal processing circuit 23 performs the flicker correction setting in a case where an image of an object is picked up under illumination driven with a power source frequency of 60 Hz.

The flicker correcting device 10 may output the power source frequency stored in the nonvolatile memory 5 from the control unit 6, through the interface 25, to the light receiving unit 21 in which flicker correction setting may be performed.

The signal processing circuit 23 analyzes the predetermined number of image data (image data for predetermined time) stored in the memory 24 and determines whether or not a flicker is detected, based on the flicker detection command written from the control unit 6 (Step S4). The number (time) of image data used for determination on the flicker detection in Step S4 may be changed depending on the kind or state of an object. When the signal processing circuit 23 determines that the flicker is detected, it outputs a result of the flicker detection to the control unit 6 through the interface 25. Thus, the control unit 6 acquires the result of flicker detection (Step S5).

In addition, the signal processing circuit 23 performs a flicker correction setting based on the result of flicker detection (Step S6). For example, if the flicker correction setting set in Step S3 is under illumination driven with the power source frequency of 60 Hz and an actual image pickup environment is under illumination driven with a power source frequency of 50 Hz, a flicker occurs in an acquired image, and accordingly, a flicker correction setting corresponding to the illumination driven with the power source frequency of 50 Hz is performed in Step S6.

Based on the result of flicker detection, the control unit 6 determines a power source frequency of the illumination under the actual image pickup environment and writes the determined power source frequency into the nonvolatile memory 5 (Step S7).

According to the above procedure, based on the power source frequency stored in the nonvolatile memory 5, the flicker correction setting is performed before the flicker is detected. The power source frequency stored in the nonvolatile memory 5 is written based on a detection result obtained whenever flicker detection is performed. Namely, current flicker detection is performed after a flicker correction setting corresponding to a power source frequency determined in previous flicker detection. Accordingly, if there in no difference between a power source frequency in current image pickup and a power source frequency in previous image pickup, there occurs no flicker during flicker detection. In this manner, it is possible to reduce the frequency of occurrence of flicker during flicker detection.

The information stored in the nonvolatile memory 5 may include not only a power source frequency itself but also information related to a power source frequency of illumination under image pickup environments, such as information on exposure time, information on correction setting of the signal processing circuit 23, and the like.

Figure 3:
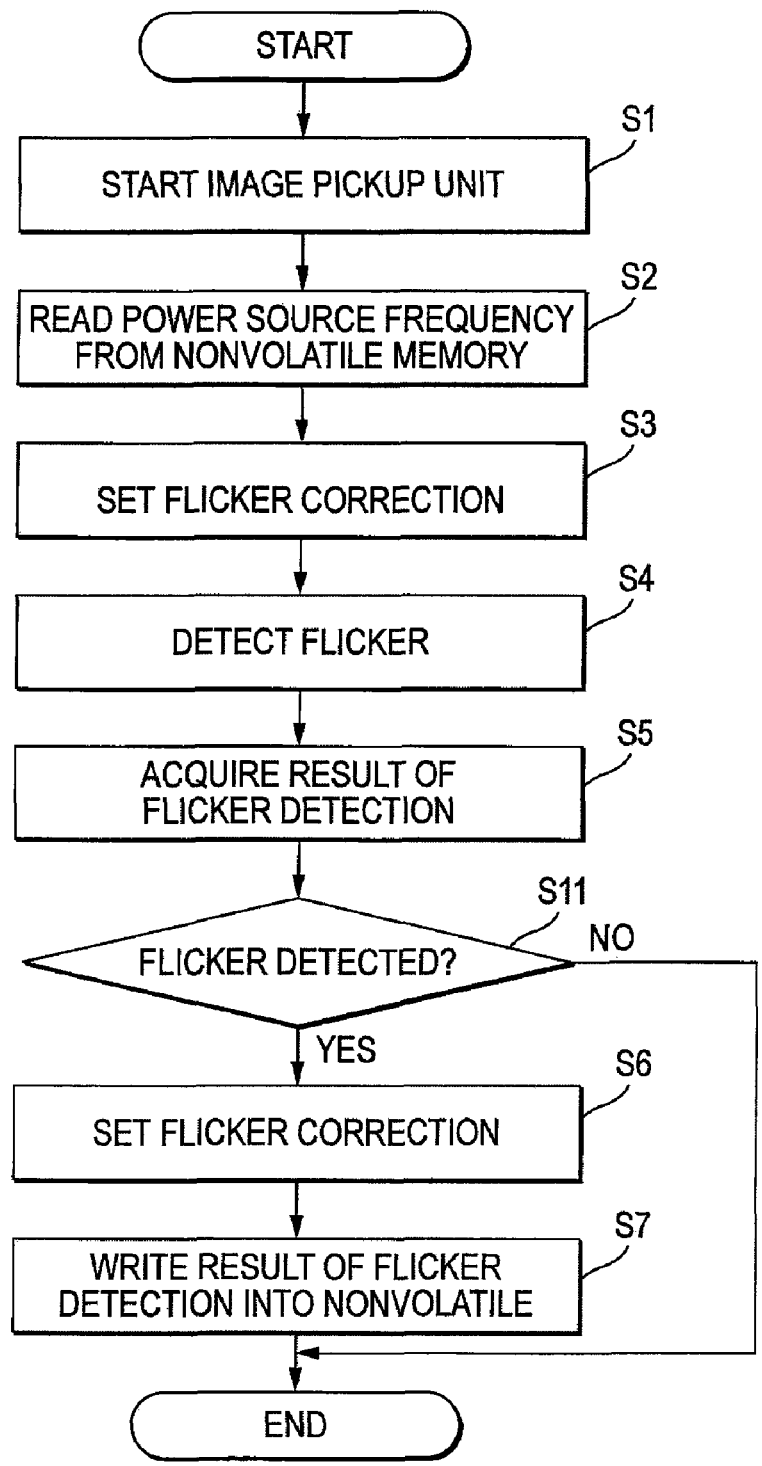
FIG. 3 is a flow chart illustrating a second example of a flicker correcting method according to an embodiment of the invention.

FIG. 3 is a flow chart illustrating a second example of a flicker correcting method according to an embodiment of the invention. In FIG. 3, the same elements as FIG. 2 are denoted by the same reference numerals.

As shown in FIG. 3, as a flicker detection result obtained by the signal processing circuit 23, if it is determined that a flicker is present (YES in Step S11), the signal processing circuit 23 performs a flicker correction setting in Step S6 and the control unit 6 writes a power source frequency into the nonvolatile memory in Step S7.

On the other hand, as a flicker detection result obtained by the signal processing circuit 23, if it is determined that no flicker is present (NO in Step S11), the process is terminated. If no flicker is detected, there is no problem that the present flicker correction setting (performed in Step S3) is continued and it is regarded that there is no difference between the power source frequency in this image pickup and the power source frequency stored in the nonvolatile memory 5. In this manner, when it is regarded that there is no change in the power source frequency of illumination under image pickup environments, writing of information into the nonvolatile memory 5 can be omitted.

According to the embodiment of the present invention, it is possible to reduce the frequency of occurrence of flickers during flicker detection when an image pickup device is continuously used under environments of same power source frequency.

Industrial Applicability

The flicker correcting device and flicker correcting method of the present invention have an advantage of reduction of occurrence of flickers during flicker detection and are useful for digital camera, mobile terminals having an image pickup function, etc.

The invention claimed is:

1. A flicker correcting device, comprising:
a nonvolatile memory that stores information on a power source frequency of illumination under an image pickup environment previously encountered during a previous image pickup;
a flicker correction setting unit that performs, upon starting, an initial setting related to flicker correction of an image pickup unit that picks up an image, based on the information on the power source frequency of illumination under the image pickup environment previously encountered that is stored in the nonvolatile memory;
a flicker detecting unit that detects a flicker in image data acquired in an initial state set by the flicker correction setting unit; and
a writing unit that writes information on a power source frequency of illumination under an image pickup environment currently encountered into the nonvolatile memory based on a result of detection by the flicker detecting unit, for use in a subsequent initial setting upon starting by the flicker correction setting unit,
wherein, before the flicker detecting unit detects the flicker in the image data, the flicker correcting device generates the image data by performing flicker correction, according to the initial setting, on the image, and then the flicker detecting unit performs flicker detection on the image data generated by performing the flicker correction on the image.

2. The flicker correcting device according to claim 1, wherein the writing unit writes the information on the power source frequency into the nonvolatile memory only when a flicker is detected, by the flicker detecting unit.

3. The flicker correcting device according to claim 1, wherein the writing unit writes the information on the power source frequency into the nonvolatile memory only when a flicker is detected, by the flicker detecting unit, in an incorrectly flicker corrected image.

4. A flicker correcting method, comprising:

upon starting an image pickup unit, reading information on a power source frequency of illumination under an image pickup environment previously encountered during a previous image pickup, from a nonvolatile memory that stores the information;

performing, based on the information on the power source frequency of illumination under the image pickup environment previously encountered that is read from the nonvolatile memory, an initial setting related to flicker correction of the image pickup unit, which picks up an image, and generating image data by performing flicker correction, according to the initial setting, on the image;

subsequent to said generating, detecting a flicker in said image data generated by performing flicker correction, according to the initial setting, on the image; and writing information on a power source frequency of illumination under an image pickup environment currently encountered into the nonvolatile memory based on a result of the flicker detection, for use in a subsequent initial setting related to flicker correction of the image pickup unit.

5. A flicker correcting method of claim 4, wherein the step of writing is performed only when a flicker is detected in an incorrectly flicker corrected image.

6. A non-transitory computer-readable medium recording a flicker correcting program that permits to perform the flicker correcting method as set forth in claim 4.

7. A pickup device, comprising the flicker correcting device as set forth in claim 1.

8. A mobile terminal, comprising the flicker correcting device as set forth in claim 1.

* * * * *